Aug. 3, 1937.  P. FENAILLE  2,088,849
UNIVERSAL JOINT
Filed June 26, 1934   2 Sheets-Sheet 1

Inventor
Pierre Fenaille
By Browne & Phelps
Attorneys

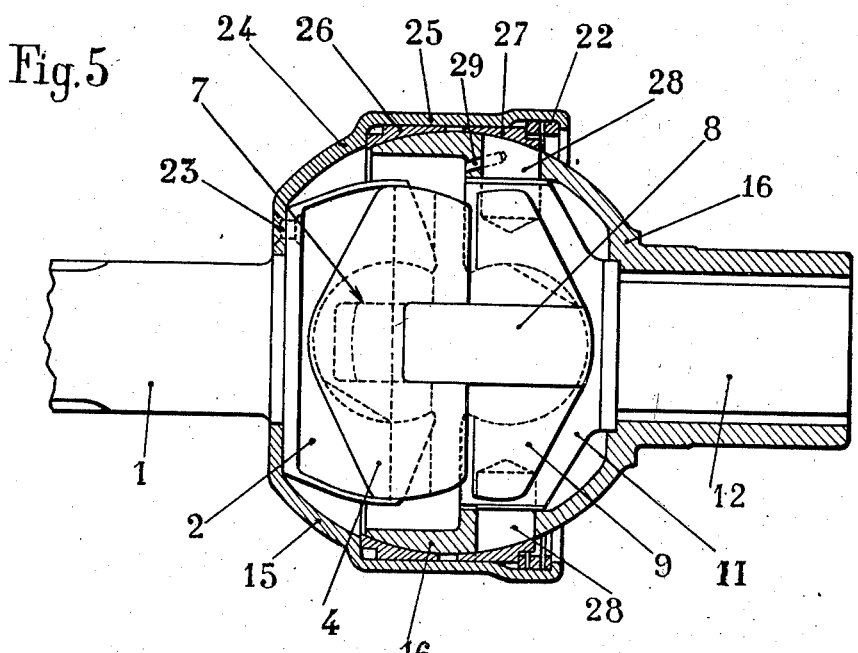
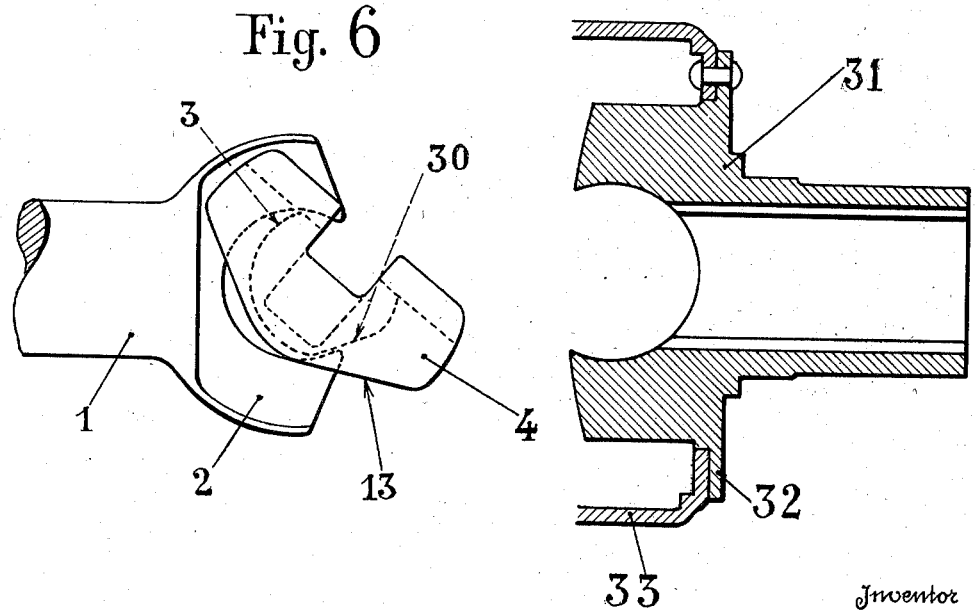

Patented Aug. 3, 1937

2,088,849

UNITED STATES PATENT OFFICE 2,088,849

UNIVERSAL JOINT

Pierre Fenaille, Paris, France

Application June 26, 1934, Serial No. 732,534
In France June 28, 1933

3 Claims. (Cl. 64—21)

The present invention relates to universal joints for coupling a shaft to another shaft making with the first mentioned one a certain angle, which may vary, at least within certain limits.

Universal joints of this kind generally include organs serving to transmit the rotary movement proper from one shaft to the other and a device for keeping the shafts in such relative positions that their axes intersect each other at a point which is the center of the joint.

A first object of the present invention is to provide a universal joint of this kind in which the whole of the organs that serve to transmit the movement from one shaft to the other are inclosed in a sphere made of two parts mounted on said shafts.

Another object of the present invention is to provide a universal joint which occupies as little space as possible while being truly homocinetic, that is to say capable of transmitting the rotational movement without any deformation, such a joint being much less expensive to manufacture and as compact and elegant of aspect as an ordinary Cardan joint.

According to the present invention, the device that constitutes the hollow sphere above referred to consists of two hollow spherical caps mounted on the two shafts respectively and fitting in each other in the same manner as the elements of a ball and socket joint, so that the transmission organs are, as above explained, inclosed in the spherical casing thus formed.

According to an embodiment of the invention, the outer spherical cap will preferably be made of two portions, one of which is mounted directly on the corresponding shaft while the other one is mounted on said first mentioned portion and comprises a kind of flange serving to maintain in position the inner spherical cap carried by the other shaft. The connection between the two portions of the outer spherical cap will preferably be ensured by means of a spring or any other elastic device, in such manner as to elastically apply the two spherical caps against each other.

According to the present invention, the organs serving to transmit the rotary movement from one shaft to the other will preferably consist of two intermediate elements jointed to the two shafts respectively and including one or more tenons and slots having flat faces adapted to slidably engage into one another, according to the device the principle of which is described in French Patent No. 628,309, filed Dec. 8, 1926. The articulation between these elements and the respective shafts will preferably be obtained by means of circular forks carried by the shafts and engaging into circular grooves provided in said elements. Alternately, these articulations could include guiding axes and cooperating plane surfaces at right angles to said axes and serving to transmit stresses.

On the other hand, according to another characteristic feature of the present invention, the two intermediate elements, of approximately spherical shape, will preferably be cut away at the rear so as to permit of reinforcing the forks in these points and of reducing the space occupied by the joint.

I may also provide, in the joint, between the intermediate elements, one or several springs tending to constantly push these elements away from each other. Besides, these springs can be used in replacement of the outer springs that tend to apply the two spherical caps against each other.

Another object of the present invention is to facilitate the assembling of the intermediate elements with their respective shafts, when said assembling is obtained by means of forks carried by the shafts and engaging in circular grooves provided in the intermediate elements. In this case the fact that the forks are reinforced in their rear part and that the intermediate elements are correspondingly cut away renders the assembling of the parts somewhat difficult. In order to obviate these drawbacks, each intermediate element has formed in the groove thereof a flat portion which greatly facilitates the insertion of the fork into said groove.

On the other hand, according to a modification the outer spherical cap consists of two elements, one of which is disposed on the outside and is of cylindrical shape, while the other one is adapted to fit in said cylindrical element and to engage with the inner spherical cap which engages therein in the manner of the ball of a ball and socket joint. This inner element of the outer spherical cap preferably consists of two spherical rings made of copper or any antifriction metal.

Finally, according to another characteristic feature of the present invention, one of the forks may be made integral with a hollow shaft provided with an inner groove so as to be capable of fitting directly on a male shaft element provided with a corresponding key.

The device according to the present invention can be employed whenever it is desired to transmit a rotary movement from one shaft to another shaft making with the first mentioned one a certain angle, either variable or not, and especially for the transmission of the movement of an engine to the wheels of a vehicle when said wheels serve to steer the vehicle. In the case of an automobile vehicle, universal joints of this type may be provided at the end of the transmission shaft (differential) so as to replace the Cardan joints that are generally employed for this purpose, and other joints according to the present invention may be provided on the shaft leading to the wheels, so as to permit of turning said wheels about a vertical axis. In this case, the center of these joints will be disposed preferably on the pivoting axis of the wheels.

Other features of the present invention will result from the following detailed description thereof.

Preferred embodiments of the present invention will be hereinafter described, with reference to the accompanying drawings, given merely by way of example, and in which:

Fig. 5 is a view similar to Fig. 1 showing a modification;

Fig. 6 is a detail view showing how the fork and the intermediate element can be engaged together;

Fig. 7 shows a modification of a shaft element and the corresponding fork.

Figure 1:
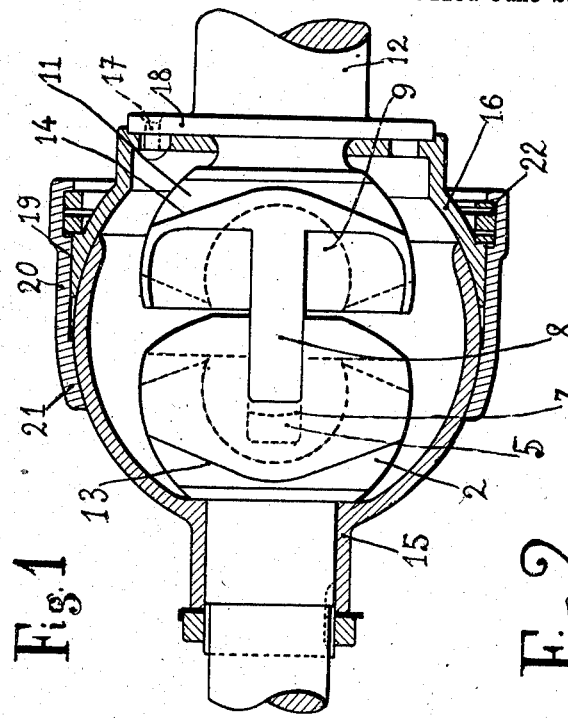
Fig. 1 is a sectional view, partly in elevation of the whole of the universal joint.
Figure 2:
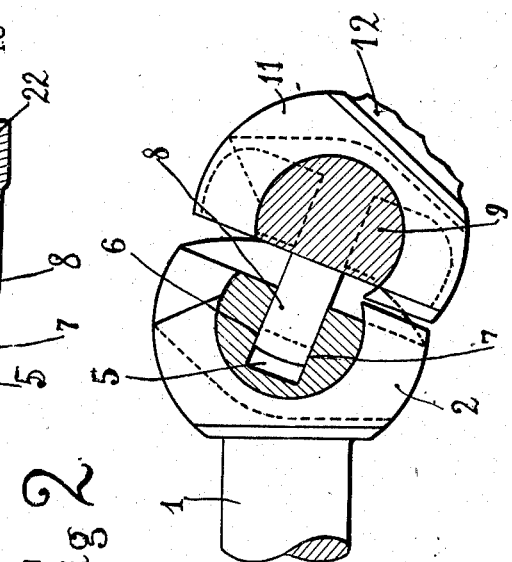
Fig. 2 is a corresponding part view showing the transmission organs of the joint in the position in which the shafts make with one another a certain angle.
Figure 3:
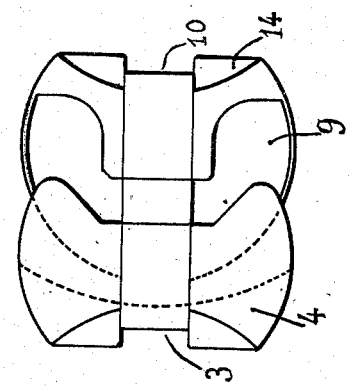
Fig. 3 is an elevational view of the two intermediate elements of the joint shown after a revolution of the shafts of 90°.
Figure 4:
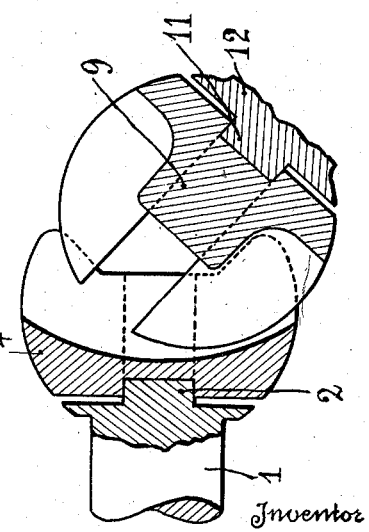
Fig. 4 is an elevational view, partly in section, of the same elements and of the ends of the shafts, said shafts being shown as making a certain angle with one another.

In the embodiment shown in Figs. 1 to 4, reference numeral 1 designates one of the shafts, provided at its end with a fork 2 which engages in a circular groove 3 provided in intermediate element 4. This intermediate element 4 is provided, in a plane at right angles to said groove, with a slot 5 having plane faces 6 and 7. In this slot is slidably engaged a tenon 8, having also plane faces, carried by the other intermediate element 9. This last mentioned intermediate element 9 is provided with a circular groove 10 (Fig. 3) at right angles to the general plane of the tenon and in which is engaged a fork 11 carried by the end of the second transmission shaft 12.

This device works in the following manner:

Fork 2, which is carried by shaft 1, transmits the rotary movement of said shaft to element 4, which in turn drives element 9, owing to the tenon and slot connection between these two elements. Element 9 in turn transmits the rotary movement to shaft 12. The principle of operation of the various parts has been fully described in the French Patent No. 628,309 above referred to.

According to the present invention the intermediate elements 4 and 9 are cut away in their rear parts at 13 and 14 (Figs. 1 and 3) so as to reduce the place occupied by the parts and to permit of mounting the shafts nearer to each other.

On the other, according to the present invention, shaft 1 carries a spherical cap 15 fixed thereon either by shrinkage or otherwise.

In a likewise manner, the other shaft 12 also carries a spherical cap 16 fixed thereon by means of rivets, which are riveted on a collar 18 of this shaft. The last mentioned spherical cap is provided with an outer cylindrical surface 19 provided at the front with a cylindrical sleeve 20 slidably mounted thereon and the front end of which 21 forms an element of a spherical cap adapted to fit on cap 15. A spring 22, bearing at one end against a flange of sleeve 20 and at the other end against a shoulder provided on spherical cap 16 tends to apply spherical portion 21 upon spherical cap 15 and therefore to apply said cap 15 against the inner spherical surface of cap 16. With this arrangement the two spherical caps are constantly applied against each other with a uniform strength and any play that might occur between these parts is automatically taken up.

I will explain here how spring 22 can be inserted into the cavity existing between the two spherical caps: The coils of this spring are twisted so as to reduce the diameter of said spring so that it can be freely inserted in position. The spring is then allowed to expand and it automatically occupies the desired position. Besides the displacements of this spring are relatively small.

The cavity existing between the two spherical caps 15 and 16 and which contains the elements 2 and 12 of the joint is filled with lubricant.

The arrangement of the spherical caps as above explained permits of ensuring a good working of the device whatever be the angle that the shafts make with each other, by positioning the elements that serve to transmit the movement from one shaft to the other suitably for obtaining a correct working thereof. On the other hand, these elements are protected against outside action. In order to increase this protection, I may also provide a leather casing covering either wholly or partly the sphere in which the joint is mounted. The joint according to the present invention forms a whole which can be fitted in position immediately, without necessitating any special arrangement for mounting it, which is a considerable advantage for practical purposes.

As above explained, the joint according to the present invention can be utilized in the place of Cardan joints in mechanical transmissions.

Of course, the specific arrangement above described has been given merely by way of example and might be modified without departing from the principle of the present invention. For instance, the spherical caps, instead of being fixed to the shafts, could be simply mounted free on said shafts.

In the embodiment shown in Fig. 5, spherical cap 15 is provided at its end with a cylindrical portion 25, within which are fitted two rings 26 and 27 the inner surfaces of which are spherical so that the inner spherical cap 16 can fit inside said rings.

These two rings 26 and 27 are preferably made of an antifriction metal, such as copper, etc.

A spring 22 maintains these rings constantly applied against the outer surface of cap 16.

A lug 28, fixed by means of a pin 29, is preferably utilized for securing fork 11, which is rigid with shaft 12, to cap 16.

This arrangement has the advantage that spherical cap 24, needs not be machined with a very great precision since it is only parts 27 and 26 that bear against cap 16.

As these elements 26 and 27 are made of an antifriction metal, friction between these elements and cap 16 is considerably reduced. The assembling of these parts can be performed without difficulty: Element 26 is first engaged into cylindrical cap 25, then cap 16, then element 27, and finally spring 22 is introduced in position.

Fig. 6 shows that the groove 3 of element 4 is provided with a flat part 30, which permits the fork 2 of shaft 1 to be easily introduced into said groove, as shown by Fig. 6.

Of course, the other intermediate element 9 is also provided with a flat portion in its groove.

Fig. 7 shows a modification of the structure of shaft 12 and the corresponding fork 11 illustrated by Fig. 5. According to this modification, shaft 31 is hollow and provided with a groove or a rib so as to permit of engaging it on a male shaft. The fork is rigid with a circular edge 32 connected, for instance by means of rivets, with a cylindrical portion 33 corresponding to part 25 of Fig. 5.

In this case, the arrangement of the spherical caps that surround the joint is the reverse of that illustrated by Fig. 5, but of course, the general arrangement is the same.

While I have in the preceding description, disclosed what I deem to be preferred embodiments of the present invention, it should be well understood that I do not wish to be limited thereto as there might be changes made in the arrangement, disposition and form of the parts without departing from the principle of my invention as comprehended within the scope of the appended claims.

What I claim is:

1. A universal joint for connecting together two shafts adapted to make any angle with each other, which comprises, in combination, two forks, having circular inner surfaces, carried by said shafts respectively, an intermediate piece having a circular groove formed in the periphery thereof adapted to accommodate one of said forks, said intermediate piece being provided with a slot having plane faces at right angles to the plane of said groove, another intermediate piece having a circular groove formed in the periphery thereof adapted to accommodate the other fork, a tenon integral with said second mentioned intermediate piece having plane faces at right angles to the plane of said second mentioned groove, said tenon being slidably engaged in said slot so that its plane faces fit against the plane faces of said slot, both of said intermediate pieces being cut away at their rear parts so that the depth of each of said grooves is minimum in the direction of the middle plane of said tenon and slot, and a shoulder integral with each of said forks extending close to the rear part of the intermediate piece associated with said fork.

2. A universal joint according to claim 1 in which the bottom of each of said grooves is provided with a flat portion so as to permit of easily introducing the forks into the corresponding grooves of said intermediate pieces respectively.

3. A universal joint according to claim 1 which further includes a hollow shaft element rigid with one of said forks, and keying means for angularly fixing said hollow shaft element to one of said first mentioned shafts.

PIERRE FENAILLE.